(12) United States Patent
Wagenaar et al.

(10) Patent No.: US 6,274,095 B1
(45) Date of Patent: *Aug. 14, 2001

(54) METHOD AND APPARATUS FOR THERMAL TREATMENT OF NON-GASEOUS MATERIAL

(75) Inventors: Bertus Michiel Wagenaar, Hengelo; Wolter Prins, Enschede; Willibrordus Petrus Maria Van Swaaij, Losser; Arthur Maurits Christiaan Janse, Hengelo, all of (NL)

(73) Assignee: Biomass Technology Group B.V., NB Enschede (NL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/011,732
(22) PCT Filed: Aug. 19, 1996
(86) PCT No.: PCT/NL96/00327
    § 371 Date: May 4, 1998
    § 102(e) Date: May 4, 1998
(87) PCT Pub. No.: WO97/06886
    PCT Pub. Date: Feb. 27, 1997

(30) Foreign Application Priority Data

Aug. 18, 1995 (NL) .................................... 1001006

(51) Int. Cl.⁷ ............................. F27B 15/00; F28D 21/00
(52) U.S. Cl. ........................... 422/139; 422/198; 422/205
(58) Field of Search ................................... 422/139–142, 422/145–147, 198, 205, 209; 159/5, 6.1; 165/118; 202/236–238; 203/89

(56) References Cited

U.S. PATENT DOCUMENTS 1,284,488 * 11/1918 Steward ............................. 554/141
4,584,064 * 4/1986 Ciais et al. ............................. 203/89

* cited by examiner

Primary Examiner—Marian C. Knode
Assistant Examiner—Alexa A. Doroshenk
(74) Attorney, Agent, or Firm—Pitney, Hardin, Kipp & Szuch, LLP

(57) ABSTRACT

The present invention provides a method for the thermal treatment of material in a rotating conical chamber (4) placed in a housing (1). According to the invention material, brought into the rotating chamber (4) and ejected due to the conical shape, is returned to the chamber (4) for further thermal treatment, without leaving the housing (1). By applying the method of the invention, the thermal efficiency is increased. In addition, wear of the means required for returning material that is to be treated again into the housing (1), is avoided. The invention also relates to two installations for putting the method into practice.

7 Claims, 1 Drawing Sheet

METHOD AND APPARATUS FOR THERMAL TREATMENT OF NON-GASEOUS MATERIAL

This application is a national stage filing under 35 USC 371 of application Ser. No. PCT/NL96/00327 filed on Aug. 19, 1996.

BACKGROUND OF THE INVENTION

1. Field of the Invention

The present invention relates to a method for the thermical treatment of non-gaseous material in a body of revolution, which body of revolution is located in a housing and comprises a substantially vertically oriented chamber which tapers toward the bottom and whose wide side is open, the chamber is rotated round its longitudinal axis and the non-gaseous material is introduced into the chamber near the tapered end and after thermical treatment is ejected, due to rotation, at the wide end of the chamber.

2. Description of the Prior Art

Such a method is described in the Dutch patent publication 8901060. According to the method described solid particulate material can quickly be cooled or heated. In the event that thermical treatment of the solid particulate material has been incomplete, the treated solid particulate material that has been ejected from the housing has to be returned into the housing. This involves loss of thermical energy and wear of the means, a pump, for instance, required for the reintroduction of the material.

OBJECTS AND SUMMARY OF THE INVENTION

It is the aim of the present invention to improve the method described.

To this end the invention provides a method in accordance with the preamble, characterized in that the thermically treated non-gaseous material is returned to the tapered end in the chamber inside the housing.

This avoids wear of the means required for the return of material and increases the thermical efficiency.

The invention also relates to an apparatus for the thermical treatment of non-gaseous material, which apparatus comprises a body of revolution, located in a housing and a substantially vertically oriented chamber which tapers toward the bottom, whose wide side is open for the ejection of thermically treated non-gaseous material, the body of revolution being rotatable round the chamber's longitudinal axis and the apparatus is provided with means for the thermical treatment of the non-gaseous material.

The apparatus of the invention is characterized in that at its tapered end the chamber has an opening which is located at a distance from the bottom of the housing and the opening of the wide end of the chamber is located within the housing.

This increases the efficiency for returning the material into the chamber.

In this way an apparatus is provided permitting the efficient return of non-gaseous material requiring further thermical treatment, while no further means, being subject to wear, are needed for transport.

According to a preferred embodiment of the apparatus of the invention the body of revolution near the lower chamber opening is provided with a blade element for carrying non-gaseous material from the bottom of the housing into the chamber for thermical treatment.

According to another embodiment the bottom of the housing is provided with means for the fluidization of thermically to be treated non-gaseous material located at the bottom of the housing.

In the cane of solid particulate material this improves its flow toward the lower opening of the chamber.

Another embodiment of the apparatus of the invention is characterized in that the housing near the open wide end of the chamber is provided with a guide element for the return of thermically treated non-gaseous material to the tapered end.

With such an embodiment the supply of energy to, or the discharge of energy from the chamber via the body of revolution is not impeded by treated material that has been ejected from the chamber and is to be returned.

In order to ensure that the treated material is returned via the guide element to the tapered end of the chamber and not higher up in the chamber, an advantageous embodiment provides the chamber with a body having a downwardly tapering passage for returning thermically treated non-gaseous material supplied by the guide element to the tapered end of the chamber.

BRIEF DESCRIPTION OF THE DRAWINGS

With reference to the Figures, the invention will now be described by means of some non-limitative embodiments.

DETAILED DESCRIPTION OF THE PREFERRED EMBODIMENT

Figure 1:
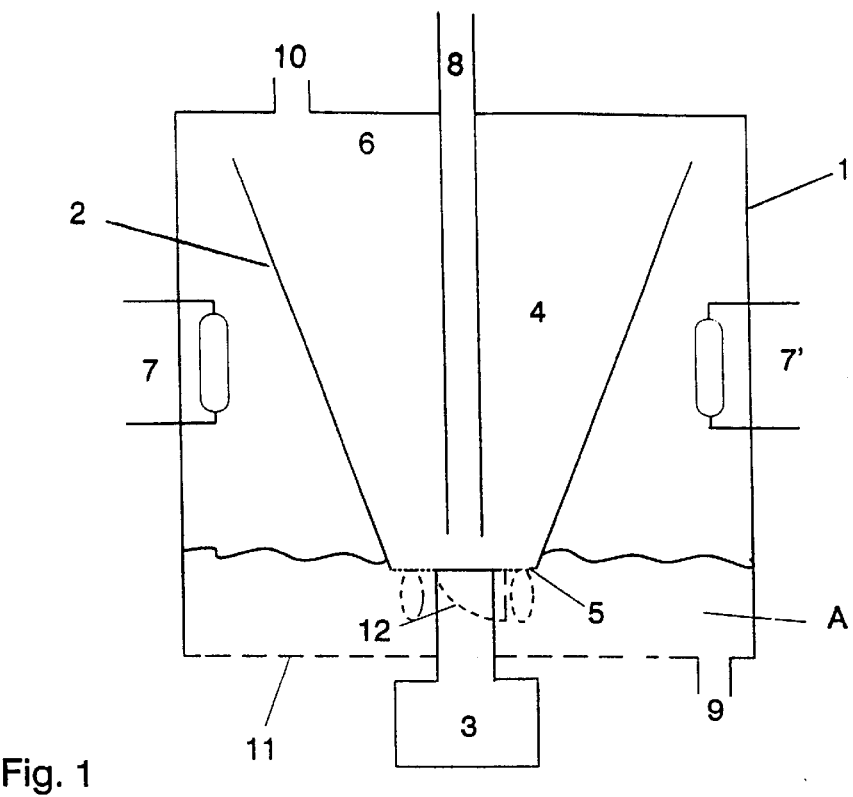
FIG. 1 shows a schematic cross-section of a first apparatus in accordance with the invention.

The cross-section shown in FIG. 1 represents a housing 1 comprising a conical body of revolution 2 driven by a motor 3. The body of revolution 2 comprises a substantially vertically positioned chamber 4 in which non-gaseous material A can be thermically treated. According to the invention the non-gaseous material may comprise both solid particulate material and liquid material. The chamber 4 tapers toward the base and has an opening 5 at the tapered end and an opening 6 at the wide and. The housing 1 comprises means for the thermical treatment of non-gaseous material A, which means in the embodiment shown in FIG. 1 are heating coils 7, 7'. Other means of heating or cooling are well-known to the expert. The apparatus is further provided with an inlet a for the thermically to be treated material A, which in the embodiment shown discharges near the tapered and of the chamber 4. An outlet 9 is provided for the discharge of thermically treated non-gaseous material. Gaseous products released, for instance, during conversion reactions or drying processes, are carried off via outlet 10.

During operation of the apparatus as represented in FIG. 1, thermically treated material A is ejected from the chamber 4 due to the rotation of the body of revolution. This settles on the bottom 11 of the housing 1. If sufficient material accumulates this material will flow to the opening 5 of the chamber 4, and thus comes into the chamber 4. In order to facilitate the return of thermically treated material A Into the chamber 4, the chamber may be provided with blade elements 12 scooping up material from the bottom 11 and by means of centrifugal forces transporting it into the chamber 4.

If the thermically treated material consists of solid particulate material then is does not always possess adequate flowability. An advantageous embodiment of the apparatus according to the invention is provided with bottom 11 which fluidizes of the solid particulate material. Instead of that it is also possible to have the bottom oscillate, which also promotes transport of the solid particulate material.

Figure 2:
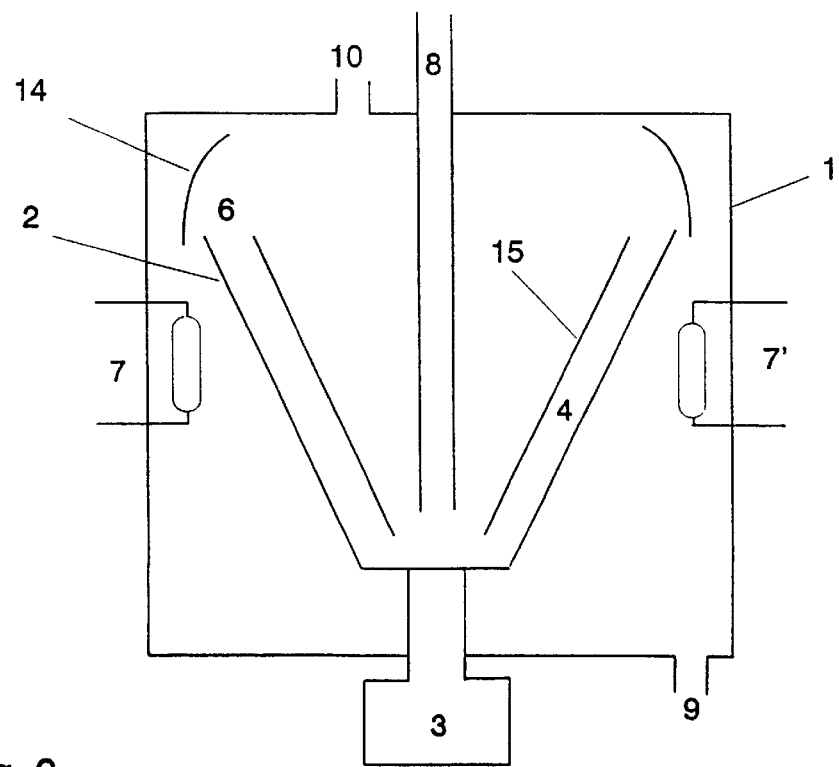
FIG. 2 shows a schematic cross-section of a second apparatus in accordance with the invention.

Another embodiment of the apparatus according to the invention is shown In FIG. 2, in which the parts corresponding to those in FIG. 1 are indicated by the same reference numbers. In contrast to the embodiment described above, wherein the returned thermically treated material A is passed to the tapered end of the chamber 4 via the outside of the body of revolution, in the embodiment described here return takes place through the chamber 4. Thermically treated material ejected through rotation of the body of revolution 2 is passed to the tapered end by a guide element 14 which may be mounted in the top of the housing 1. The force with which the material leaves the chamber 4 causes it to deflect from the guide element 14 back to the tapered end of the chamber 4. The shape of the guide element depends on parameters such as rotational velocity, direction of rotation and the type of thermically treated material, and the expert is well capable to fashion the guide element 14 such that the material is conducted back to the chamber 4, in particular to its tapered part. In order to ensure that the material actually goes to the bottom of the chamber 4 and not higher up, which could interfere with the distribution of mass in the chamber 4, the chamber 4 may be provided with a body 15 having a through-passage, in this case a funnel-like body, which body, in the embodiment shown, is stationarily mounted in the top of the housing 1, similar to the guide element 14. Material falling into the body 15 because of the guide element, falls to the tapered end of the chamber 4.

Although the funnel-like body 15 as described in the embodiment may be stationarily fastened, it is also possible to have this funnel-like body 15 rotate round a vertical axis. The precondition is that the rotational velocity of the funnel-like body 15 round the vertical axis is so low that centrifugal forces do not render it impossible for the material that has been brought into the funnel-like body 15 via the guide element 14, to reach the chamber 4 via the through-passage. If the funnel-like body rotates in the opposite direction to that of the body of revolution 2, the ejection of material from the chamber 4 will be delayed and the lingering time respectively the mass density of the material in the chamber 4 will be increased. If desired, the funnel-like body is may consist of a lower and upper part, with the upper part rotating in the opposite direction. The lower part may be stationary or, if desired, may have the same direction of rotation as the body of revolution 2 to promote the transport of material to wider parts of the chamber 4. It is preferable therefore, that the funnel-like body 15 possesses at least two parts being rotatable in relation to each other and placed above each other so that at least one of the parts is rotatable round a substantially vertical axis.

The thermal treatment may entail cooling or heating. The invention is particularly suitable for:

ultra-fast drying of liquids;
ultra-fast drying of slurries with centrifugal solid state separation;
the production of microcrystals;
the calcination of solid matter;
quick pyrolysis of biomass;
quick pyrolysis of coal and oil-bearing rock (tar sand, shale oil);
quick pyrolysis of plastics;
the cracking of bituminous oils;
thermal quenching reactions; and
heat/catalytic cleaning of polluted soil.

For the pyrolysis of biomass, such as sawdust the biomass is fed continuously via the inlet 8 into the apparatus according to the invention, preferably into the chamber 4 near its tapered end. The mass flow of hot recirculating material into the apparatus is perhaps ten times as great as the mass flow of added biomass. Thorough mixing and the mixing ratio ensure that the added mass makes good contact with the hot recirculating material. This promotes quick and complete pyrolysis of the biomass.

Preferably an inert carrier material is fed with the biomass into the apparatus. A suitable carrier inert material is sand. With the method in accordance to NL 8901060 hot sand would be brought into contact with the biomass which on contact with the sand undergoes pyrolysis. The use of a relative excess of hot sand would hardly make this method energetically thus economically attractive. The apparatus in accordance with the invention allows for an energetically and economically efficient use of a relative excess of hot recirculating material, resulting in a quick and complete pyrolysis.

What is claimed is:

1. An apparatus for the thermal treatment of non-gaseous material, which apparatus comprises a body of revolution, located in a housing having a bottom and comprising a substantially vertically oriented chamber which tapers toward the bottom, whose side is open for the ejection of thermically treated non-gaseous material, the body of revolution being rotatable around the chamber's longitudinal axis and the apparatus is provided with means for the thermal treatment of the non-gaseous material, the chamber having at its tapered end an opening which is located at a distance from the bottom of the housing, the opening of a wide end of the chamber being located within the housing wherein the body of revolution (2) proximate to a lower chamber (4) opening is provided with a protruding blade element (12) for carrying solid material-comprising material from the bottom (11) of the housing (1) into the chamber (4) for thermical treatment, wherein the bottom (11) of the housing (1) is provided with means for the fluidization of material located at the bottom (11) of the housing.

2. An apparatus for the thermal treatment of non-gaseous material, which apparatus comprises a body of revolution, located in a housing having a bottom and comprising a substantially vertically oriented chamber which tapers toward the bottom, whose side is open for the ejection of thermically treated non-gaseous material, the body of revolution being rotatable round the chamber's longitudinal axis and the apparatus is provided with means for the thermal treatment of non-gaseous material, the chamber having at its tapered end an opening which is located away from the bottom of the housing, the opening of the wide end of a chamber being located within the housing, wherein the bottom (11) of the housing (1) is provided with means for the fluidization of material located at the bottom of the housing (1).

3. A method for the thermal treatment of non-gaseous material in a body of revolution, which body of revolution is located in a housing and comprises a substantially vertically oriented chamber which tapers towards the bottom and whose wide side is open, the chamber is rotated round its longitudinal axis and the non-gaseous material is introduced into the chamber proximate to a tapered end and after thermical treatment is ejected, due to rotation, at a wide end of the chamber, wherein the non-gaseous material is a solid material which is subjected to a thermical treatment to convert said solid material by a chemical conversion reaction chosen from the group consisting of a calcination reaction or a pyrolytic reaction, and said non-gaseous material comprising thermically treated solid material is returned to the tapered end in the chamber (4) inside the housing (1).

4. An apparatus for the thermical treatment of non-gaseous material, which apparatus comprises a body of revolution, located in a housing having a bottom and comprising a substantially vertically oriented chamber which tapers toward the bottom, whose side is open for the ejection of thermically treated non-gaseous material, the body of revolution being rotatable round the chamber's longitudinal axis and the apparatus is provided with means for the thermical treatment of the non-gaseous material, the chamber having at its tapered end an opening which is located at a distance from the bottom of the housing, the opening of a wide end of the chamber being located within the housing, wherein the body of revolution (2) proximate to a lower chamber (4) opening is provided with a protruding blade element (12) for carrying solid material-comprising material from the bottom (11) of the housing (1) into the chamber (4) for thermical treatment.

5. An apparatus for the thermical treatment of non-gaseous material, which apparatus comprises a body of revolution, located in a housing and a substantially vertically oriented chamber which tapers towards the bottom, whose wide side is open for the ejection of thermically treated non-gaseous material, the body of revolution being rotatable round the chamber's longitudinal axis; the apparatus is provided with means for the thermical treatment of the non-gaseous material, and in the housing near the open wide end of the chamber a guiding element is provided for deflecting solid material leaving the open wide end of the chamber, wherein the guide element (14) in arranged for returning solid, to be thermically converted material to a tapered end through the substantially vertically oriented chamber.

6. An apparatus according to claim 5, wherein the chamber (4) is provided with a downwardly tapering passage for returning material by the guide element (14) to the tapered end of the chamber.

7. An apparatus according with claim 6, wherein the body (15) possesses at least two parts being rotatable in relation to each other and placed above each other so that at least one of the parts is rotatable round a substantially vertical axis.

* * * * *